United States Patent
de Oliveira

(10) Patent No.: US 7,168,723 B2
(45) Date of Patent: Jan. 30, 2007

(54) FRONT WHEEL DRIVE FOR TOY VEHICLES

(75) Inventor: Joaquim Matias de Oliveira, Guarulhos (BR)

(73) Assignee: Magic Toys Do Brasil Ind. E Com. Ltda., Guarulhos (BR)

( * ) Notice: Subject to any disclaimer, the term of this patent is extended or adjusted under 35 U.S.C. 154(b) by 152 days.

(21) Appl. No.: 10/766,835

(22) Filed: Jan. 30, 2004

(65) Prior Publication Data

US 2004/0245757 A1    Dec. 9, 2004

(30) Foreign Application Priority Data

Jan. 31, 2003    (BR) .................................. 0300274

(51) Int. Cl.
*B60K 21/00* (2006.01)
(52) U.S. Cl. .................. 280/240; 180/256; 446/468
(58) Field of Classification Search ............... None
See application file for complete search history.

(56) References Cited

U.S. PATENT DOCUMENTS

| | | | | |
|---|---|---|---|---|
| 231,609 A * | 8/1880 | Perkins ..................... 280/240 |
| 576,746 A * | 2/1897 | Spangler ................... 280/7.17 |
| 1,041,936 A * | 10/1912 | Worthington ............... 280/240 |
| 1,547,870 A * | 7/1925 | Green ......................... 446/468 |
| 2,505,057 A * | 4/1950 | Middler ...................... 280/267 |
| 3,718,344 A * | 2/1973 | Lohr et al. .................. 280/261 |
| 5,271,638 A * | 12/1993 | Yale ..................... 280/124.102 |
| 5,397,145 A * | 3/1995 | Kobluk ....................... 280/240 |
| 5,601,377 A * | 2/1997 | Ohya .......................... 403/58 |
| 6,105,982 A * | 8/2000 | Howell et al. ............. 280/91.1 |
| 6,712,167 B2 * | 3/2004 | Gu .............................. 180/205 |

* cited by examiner

*Primary Examiner*—Christopher Bottorff
(74) *Attorney, Agent, or Firm*—Birch, Stewart, Kolasch & Birch, LLP

(57) ABSTRACT

Front wheel drive mechanism for toy vehicles in which supports are attached to the vehicle, with a drive bar being positioned between them, at each end of which is mounted a respective sub-assembly including a clasp and a cross link, of which two legs are fitted into respective openings in the clasp mounted on the end of the bar and whose other two ends are fitted into respective openings in another respective clasp attached to each wheel of the vehicle. The system is completed by a respective L-shaped rotational element connected to the ends of the clasp of the wheel, and in which are fitted the ends of a steering bar that has a U-shaped part in the center into which the steering axle is fitted, with one end bent into an L and the other end fastened to the steering wheel of the vehicle, with the entire assembly being attached to the vehicle by the supports and with the wheels and hub caps being attached at the end.

9 Claims, 7 Drawing Sheets

FIG. 7
FIG. 8
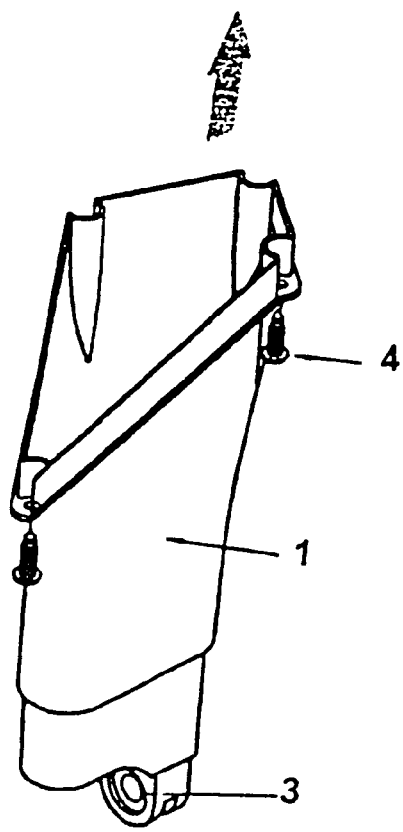
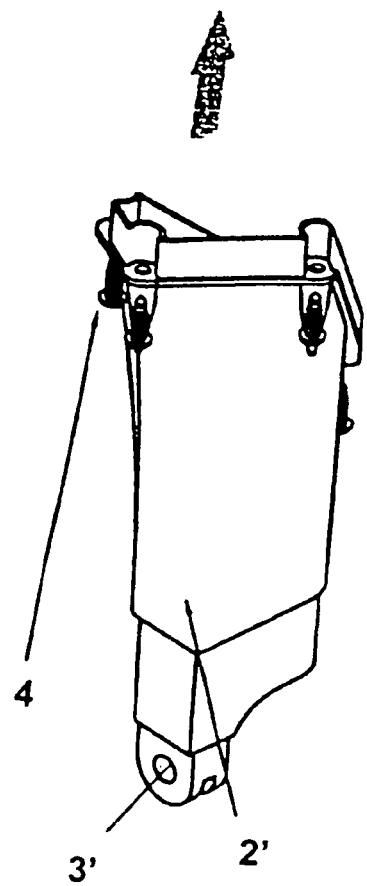

FRONT WHEEL DRIVE FOR TOY VEHICLES

This Non-provisional application claims priority under 35 U.S.C. § 119(a) on Patent Application No(s). PI 0300274-8 filed in Brazil on Jan. 31, 2003, the entire contents of which are hereby incorporated by reference.

BACKGROUND OF THE INVENTION

1. Field of the Invention

The present invention refers to a front wheel drive mechanism, designed to be connected to the steering of the vehicle and which is used to provide movement to toy vehicles (cars), where the child sits on the inside of the respective vehicle and by means of pedals and a manual steering wheel moves the vehicle forwards or backwards, as well as steering it to the right or to the left. The pedals are used to mechanically operate the car. For electric activation of the vehicle, it is necessary to have a floor with an accelerator pedal that activates an electric motor connected to the proposed mechanism system, which provides the movements desired to maneuver the vehicle.

2. Description of the Background Art

The existing systems operate with rear wheel drive (crank arms) and require the child to make a certain relatively large effort to move the pedal-controlled vehicle. The system in accordance with the invention requires much less effort on the part of the child, inasmuch as it is a rotary drive system that does not use crank arms.

SUMMARY OF THE INVENTION

The vehicle designed to use the mechanism in accordance with the invention will have an appropriate spot to accommodate the mounting of the attachment supports on the left and the right, which supports are individual pieces, for example of plastic, of a size and shape that is specific to each car, depending on the variations in size and shape of the vehicle.

In accordance with the invention, the supports are attached to the vehicle by screws or suitable attachment elements, with a drive element being positioned between them that may be a crankshaft type bar with pedals or a smooth bar with a gear to operate the vehicle by an electric motor drive system. Installed on each end of the above-mentioned bar is a sub-assembly, which includes a clasp and a cross-shaped piece called a cross link whose opposite ends fit into the respective openings in the clasps mounted on the ends of the bars and whose other two opposite ends fit into the respective openings of the other clasp attached respectively to each wheel of the vehicle. The cross link therefore has the function of transferring the rotational movement of the drive bar to the wheels, thereby providing the drive that moves the vehicle and at the same time by its mechanical principle permitting the wheels to move in an angular fashion to the right or to the left, hence simultaneously providing the vehicle with maneuverability in addition to its ability to move forwards or backwards.

The system is completed by two L-shaped rotational elements connected to the ends of the wheel clasps into which are fitted the ends of a steering bar, which features in the center a U-shaped part into which the steering axle is fitted, with one end bent into an L shape and the other end connected to the steering wheel of the vehicle. The entire assembly is fastened to the vehicle by means of the supports mentioned above, whereupon the wheels and possibly hub caps are attached, completing the assembly.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent of those skilled in the art from this detailed description.

BRIEF DESCRIPTION OF THE DRAWINGS

The present invention is more clearly explained by viewing the figures in the attached drawings.

FIG. 7 represents a perspective view of a support on the left side of a toy vehicle.

FIG. 8 represents a perspective view of a support on the right side of a toy vehicle.

DETAILED DESCRIPTION OF THE PREFERRED EMBODIMENTS

The drawings illustrate the assembly of the mechanism according to the invention.

Figure 2:
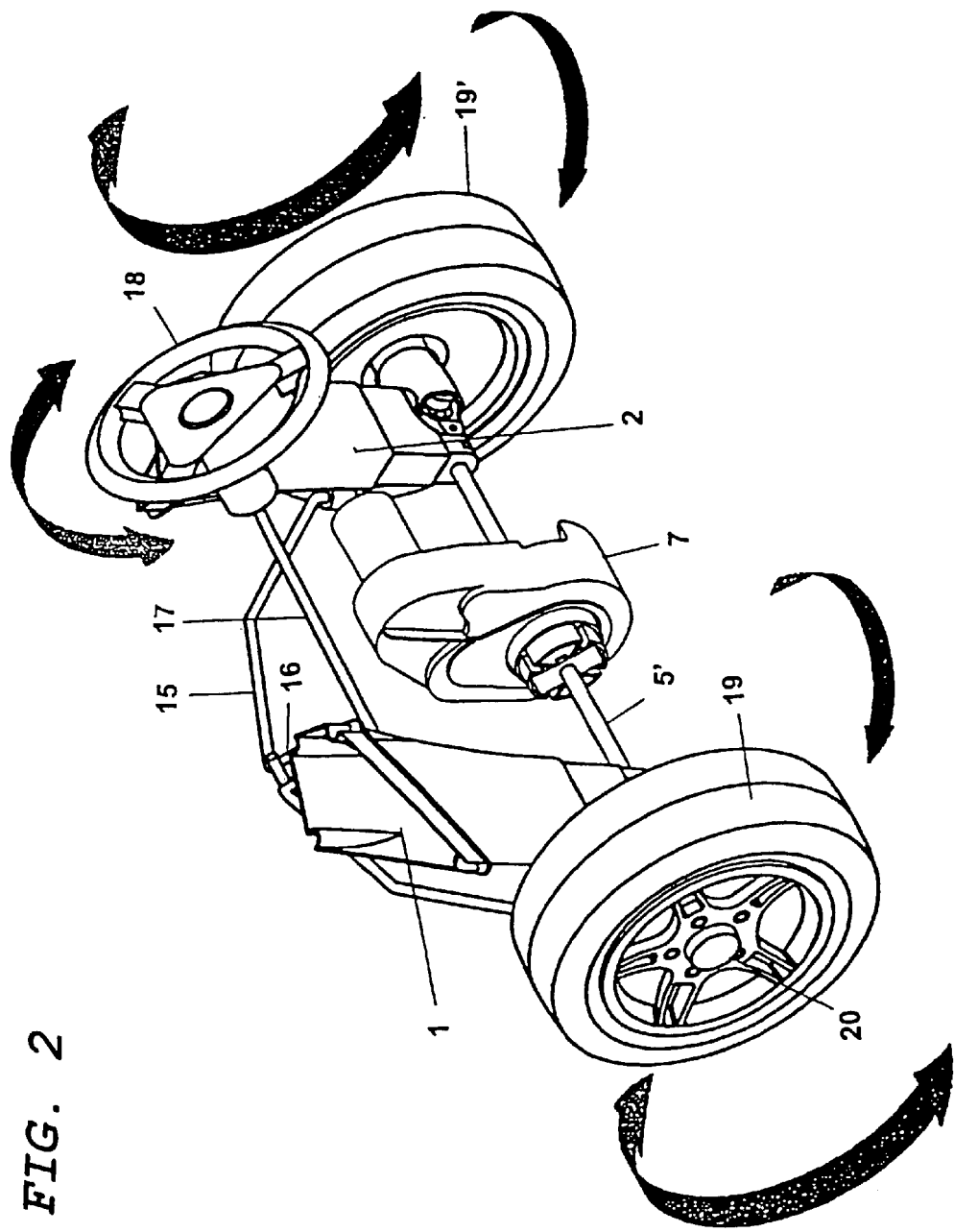
FIG. 2 represents a perspective view of a mounted, electric-driven drive assembly, with the mechanism in accordance with the present invention.
Figure 3:
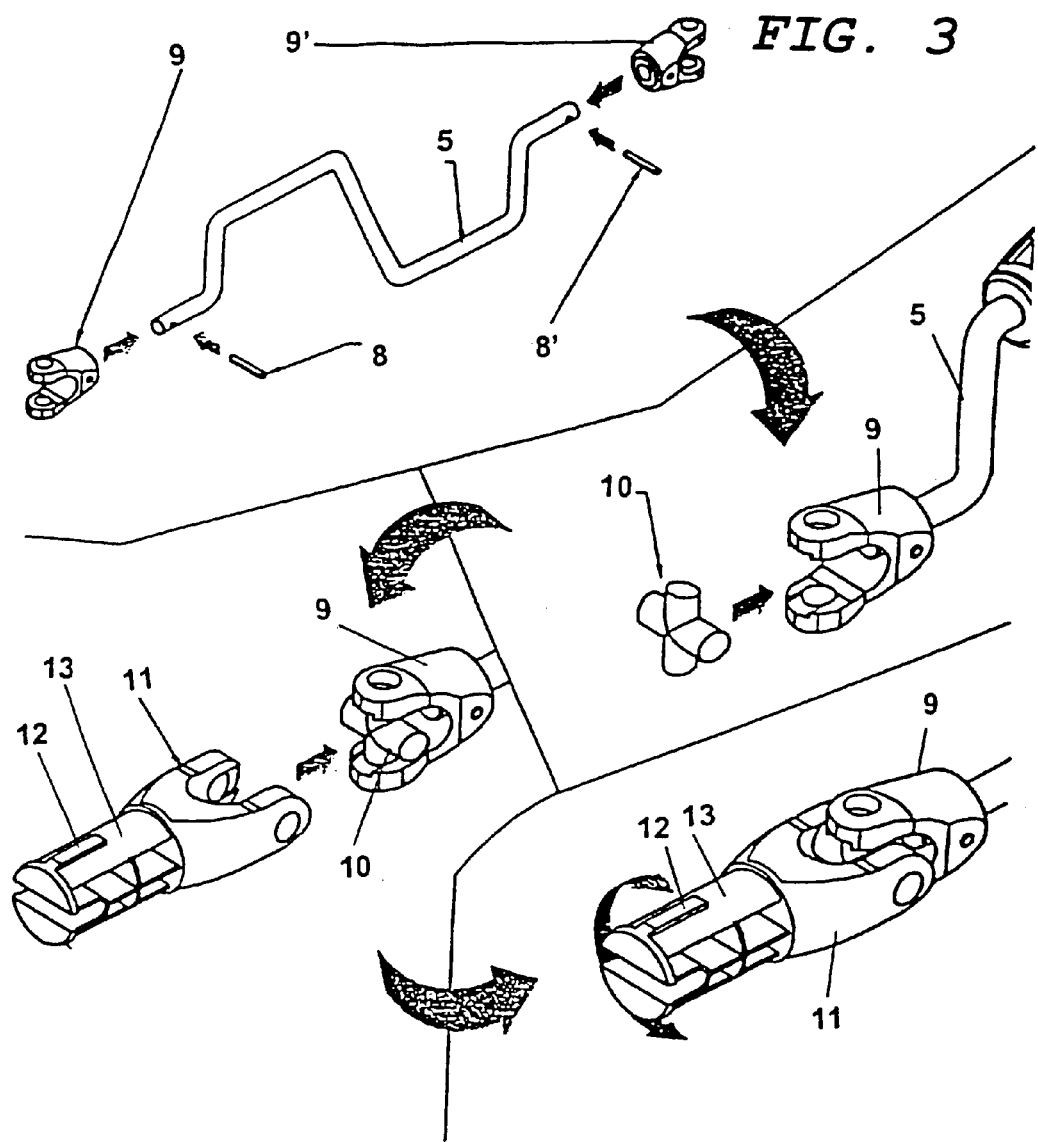
FIG. 3 represents an assembly sequence, with installation of a drive axle in the axle and wheel clasps in the vehicle equipped with the mechanism in accordance with the present invention.
Figure 6:
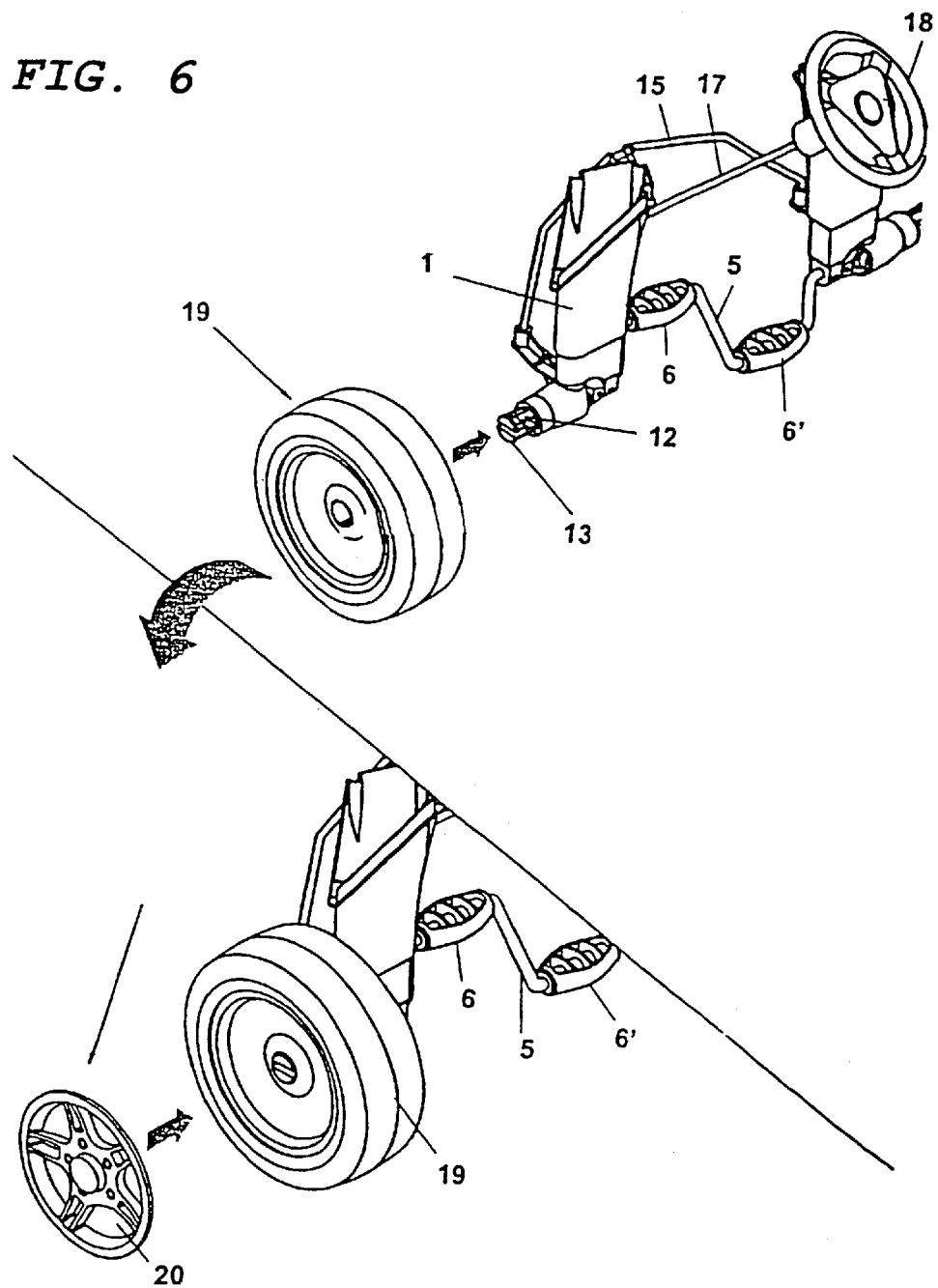
FIG. 6 represents an assembly sequence, with installation of a wheel and a hub cap in the vehicle equipped with the mechanism in accordance with the present invention.

FIG. 3 illustrates the assembly of pieces normally made of plastic, called clasps, indicated at one end by the reference number 9 (the clasp at the opposite end is not shown) and which are attached one at each end of the drive axle 5 in the case of the pedal drive system 6, 6', and 5' (FIG. 6) and in the case of the electric drive system 7 (FIG. 2) by means of respective pins 8 and 8'. Each clasp 9 receives the rotational movement of bar 5 with pedals 6, 6' in FIG. 1 (or bar 5' with motor 7, FIG. 2) and transfers this rotational movement by means of a respective piece called a cross link 10, see FIG. 3 (the drawings only show one cross link, but it is clear that there is another one on the other end of bar 5 or 5'). The cross link 10 is a piece which, as befits its name, is in the shape of a cross with two legs fitted into respective openings in clasp 9 (in the other end) and whose other two legs are fitted into corresponding openings in another clasp 11 (with the clasp at the opposite end not being shown), having a cylindrical body 13 (and 13' on the other end), which causes wheels 19 and 19' of the vehicle to turn.

Therefore, the cross link 10 has the function of transferring the rotational movement of the bar 5 or 5' to wheels 19 and 19', thereby providing the drive that moves the vehicle, with its mechanical principle at the same time permitting the wheels to move in an angular fashion to the right or the left, hence simultaneously providing the vehicle with maneuverability in addition to its ability to move forwards or backwards.

Figure 4:
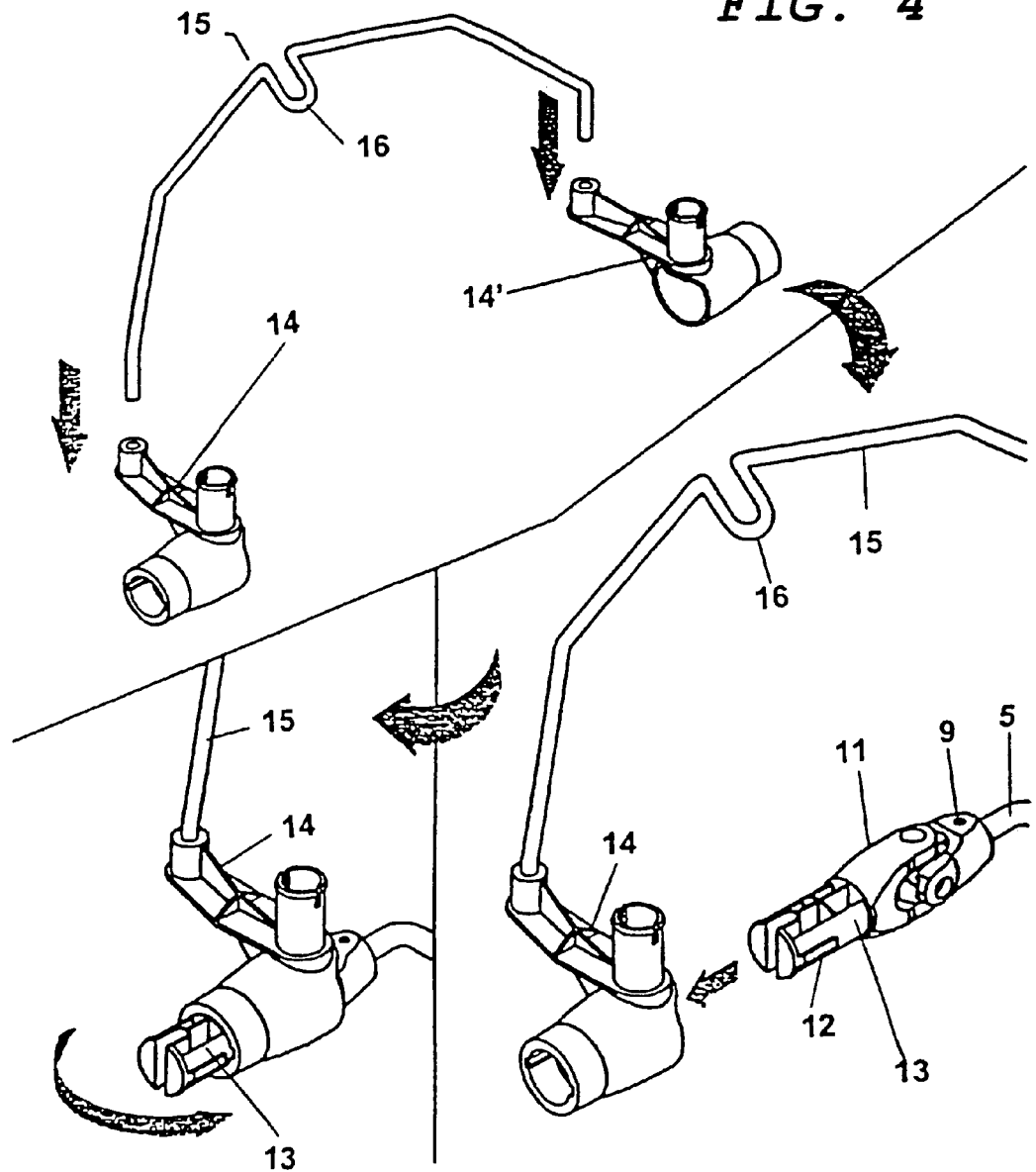
FIG. 4 represents an assembly sequence, with installation of a steering bar in the vehicle equipped with the mechanism in accordance with the present invention.
Figure 5:
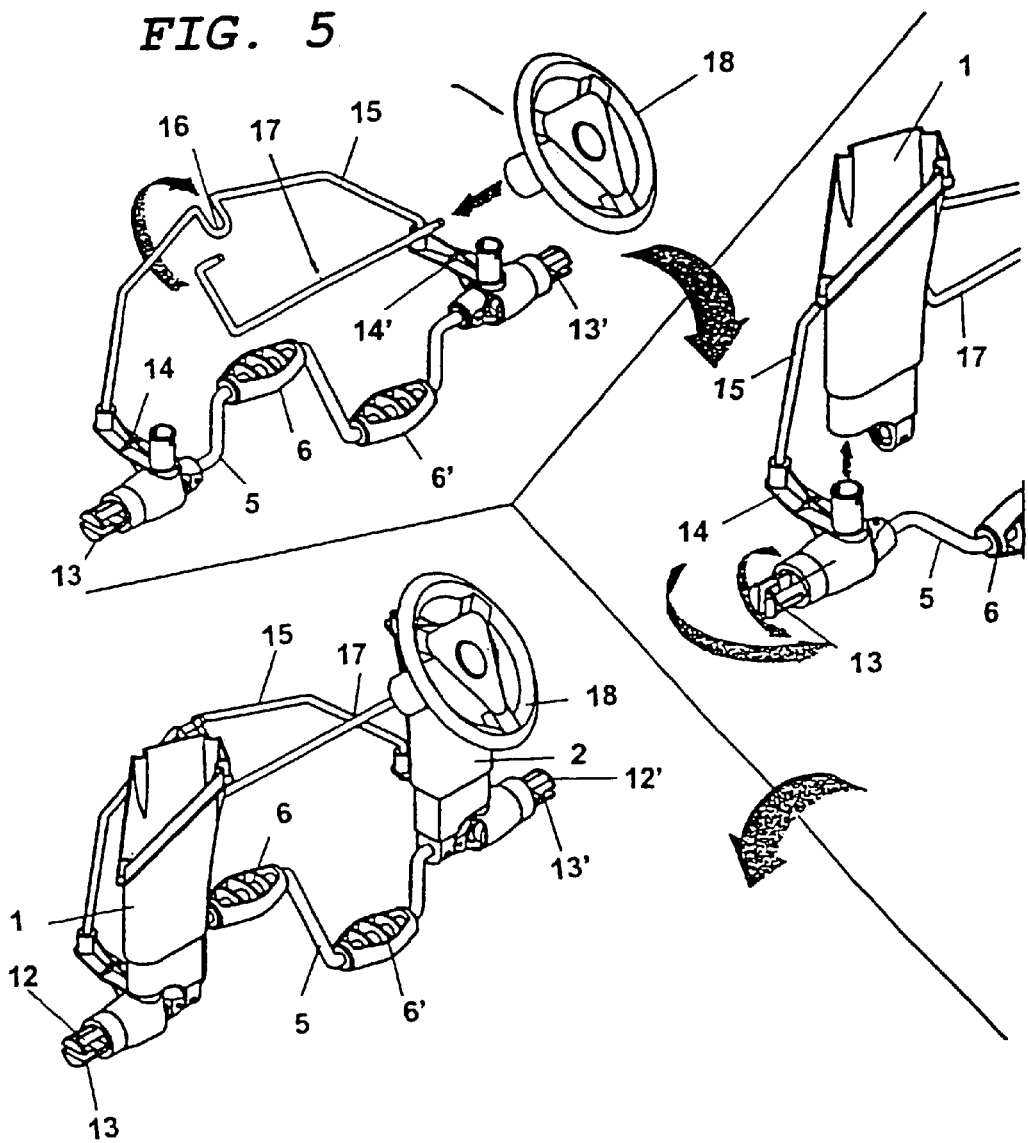
FIG. 5 represents an assembly sequence, with installation of a steering axle and a steering wheel vehicle equipped with the mechanism in accordance with the present invention.

Once the sub-assembly of cross link 10 and clasps 9 and 11 has been installed, they will be connected to the respective L-shaped rotational elements 14, 14' (FIG. 4), each one of which is fastened to one end of a steering bar 15, which is responsible for giving the vehicle the ability to make angular turns. The steering bar 15 has a bent-in part 16 in its center into which one end of the steering axle 17 is fitted (FIG. 5), connected to a steering wheel 18. This axle assembly 17 and steering wheel 18 have the function of moving the steering bar 15 to the right or the left, thereby enabling horizontal rotation (at an angle of approximately 25°) of the L-shaped rotational elements 14 and 14' and consequently the respective sub-assemblies of clasps and cross link, without interfering with the vertical movement that is responsible for driving the vehicle when activated by pedals 6, 6' or by electric motor 7.

Next, the clasp and cross link sub-assemblies are mounted on the vehicle by means of the respective supports 1 and 2 (FIG. 1), which may be attached to the vehicle by means of screws 4 (in FIG. 7) or may form an integral part of the design of the body of the vehicle. The supports 1 and 2 have holes 3 and 3' at their lower end (FIGS. 7 and 8) to permit the passage of the respective drive bar 5 or 5'.

Finally, they are fastened to wheels 19, 19', which have keyways that fit into keyways 12, 12' (FIG. 6) of the cylindrical bodies 13, 13' (FIG. 3) of the clasps 11 (and of the other one not shown). Wheels 19, 19' are forced to turn in conjunction with the turning of pedals 6, 6' or of motor 7 to prevent them from breaking loose from the assembly via wheel locks, to be concluded with installation on the wheels of the respective hub caps 20 (the corresponding hub cap of the other end not being shown) in order to put the finishing touch on the assembly, concealing the end of the drive system and thereby perfecting the exposed mechanism.

Figure 1:
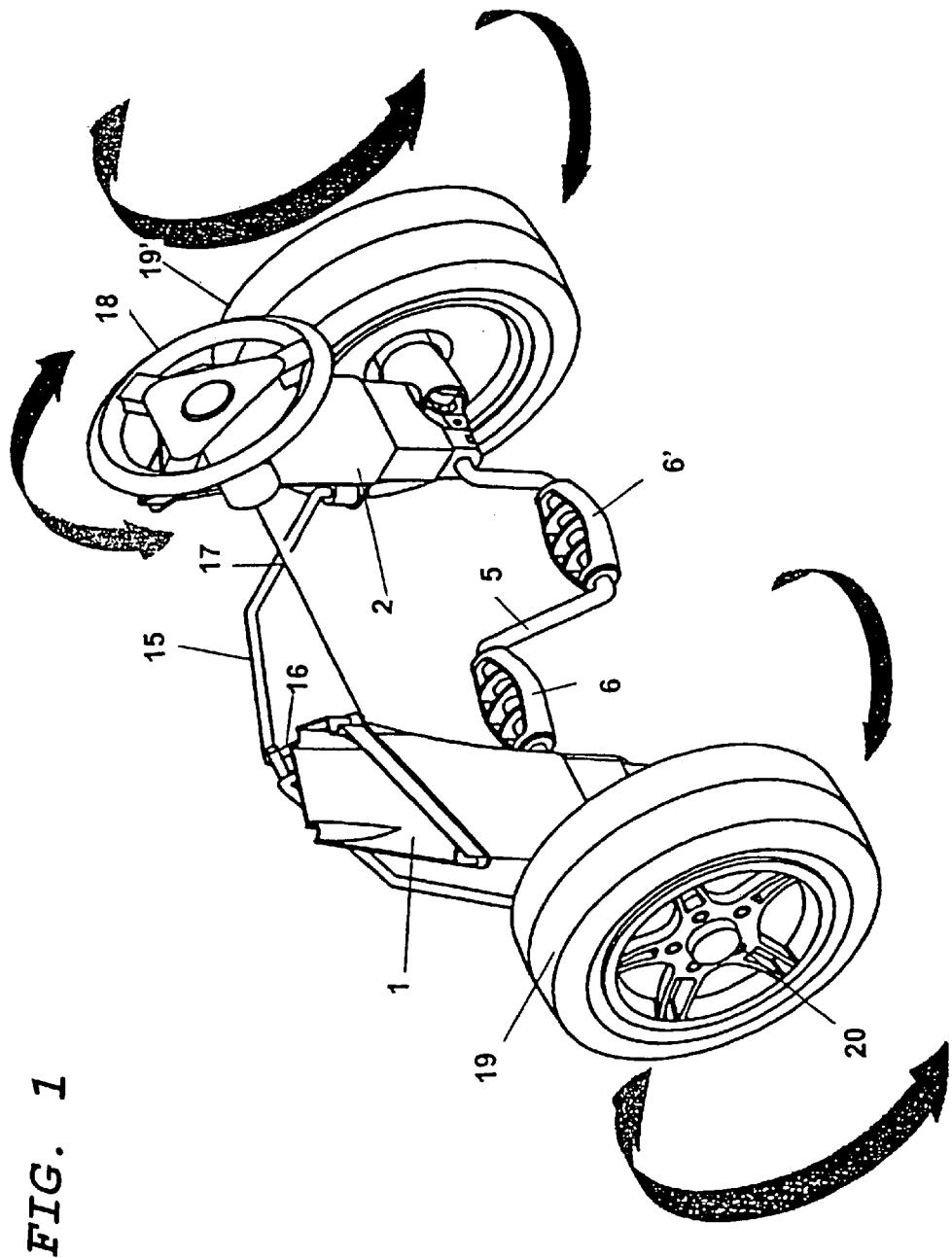
FIG. 1 represents a perspective view of a mounted, pedal-driven drive assembly, with the mechanism in accordance with the present invention.

FIGS. 1 and 2 represent views of the two complete drive systems respectively for pedal drive and for electric motor drive.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

I claim:

1. A front wheel drive mechanism for a vehicle, the mechanism permitting simultaneous displacement movement forwards and backwards and angular turning toward the right and the left, comprising:
    a pair of supports attached to the vehicle;
    a drive bar positioned between the supports;
    a sub-assembly mounted at each end of the drive bar, each respective sub-assembly including a clasp having openings and a cross link, two legs of which are fitted into the openings in each respective clasp that is mounted on the end of the drive bar and two other ends of which are fitted into respective openings in another respective clasp attached to each wheel of the vehicle; and
    a respective horizontally rotatable L-shaped rotational element having a cylindrical body fastened to the ends of the clasp of the wheel by insertion of the ends of the clasp into the cylindrical body of the L-shaped rotational element, the clasp being fitted to the ends of a steering bar that has a U-shaped part in the center designed to accommodate a steering axle, one end of which is bent into an L shape and the other end of which is connected to a steering wheel of the vehicle,
    wherein the mechanism is attached to the vehicle by means of the supports and with the wheels being attached at the end.

2. The mechanism in accordance with claim 1, wherein the drive bar is a crankshaft bar with pedals.

3. The mechanism in accordance with claim 1, wherein the drive bar is a smooth bar with a gear to operate the vehicle by an electric motor drive system.

4. The mechanism in accordance with claim 1, wherein hub caps are attached to the wheels.

5. The mechanism in accordance with claim 1, wherein the supports are separate pieces attached to the vehicle by screw attachment elements.

6. The mechanism in accordance with claim 1, wherein the supports are made integral with the vehicle by attachment elements.

7. The mechanism in accordance with claim 1, wherein the supports have holes at their lower ends to accommodate passage of the drive bar.

8. The mechanism in accordance with claim 1, wherein the vehicle is a toy vehicle.

9. A front wheel drive mechanism for a vehicle, the mechanism permitting simultaneous displacement movement forwards and backwards and angular turning toward the right and the left, comprising:
    a pair of supports attached to the vehicle;
    a drive bar positioned between the supports;
    a sub-assembly mounted at each end of the drive bar, each respective sub-assembly including a clasp having openings and a cross link, two legs of which are fitted into the openings in each respective clasp that is mounted on the end of the drive bar and the other two ends of which are fitted into respective openings in another respective clasp attached to each wheel of the vehicle;
    a respective L-shaped rotational element fastened to the ends of the clasp of the wheel into which are fitted to the ends of a steering bar that has a U-shaped part in the center designed to accommodate a steering axle, one end of which is bent into an L shape and the other end of which is connected to a steering wheel of the vehicle;
    wherein the mechanism is attached to the vehicle by means of the supports and with the wheels being attached at the end; and
    wherein the wheels have keyways that are fitted into keyways of cylindrical bodies of the clasps.

* * * * *